(12) United States Patent
Romans (10) Patent No.: US 6,216,615 B1
(45) Date of Patent: Apr. 17, 2001

(54) CHEMICAL METERING APPARATUS FOR CONTROLLED DEPOSIT OF AGRICULTURAL CHEMICALS IN COORDINATION WITH SEED SINGULATION

(76) Inventor: William W. Romans, 1121 NW. Parkridge Dr., Ankeny, IA (US) 50021

( * ) Notice: Subject to any disclaimer, the term of this patent is extended or adjusted under 35 U.S.C. 154(b) by 0 days.

(21) Appl. No.: 09/185,854

(22) Filed: Nov. 4, 1998

(51) Int. Cl.[7] .................................................. A01C 7/06
(52) U.S. Cl. ............................................ 111/177; 111/186
(58) Field of Search .................................... 111/188, 178, 111/177, 186, 36, 129, 118

(56) References Cited

U.S. PATENT DOCUMENTS

| | | | |
|---|---|---|---|
| 3,322,080 | * 5/1967 | Gatzke et al. | 111/188 |
| 3,373,705 | * 3/1968 | Hansen et al. | 111/188 |
| 3,450,074 | * 6/1969 | Gatzke et al. | 111/188 X |
| 4,561,565 | * 12/1985 | Wolf et al. | 222/28 |
| 5,024,173 | * 6/1991 | Deckler | 111/178 |
| 5,379,812 | * 1/1995 | McCunn et al. | 141/346 |

OTHER PUBLICATIONS

John Deere, MaxEmerge®Plus Planters, 1996.
Kinze Manufacturing, Inc., The Kinze Revolution in Precision Planting, 1997.

* cited by examiner

Primary Examiner—Christopher J. Novosad
(74) Attorney, Agent, or Firm—Zarley, McKee, Thomte, Voorhees & Sease

(57) ABSTRACT

The invention is an insecticide meter device for metered discharging of agricultural insecticides, and other chemicals. The insecticide metering device is designed to collect insecticide in a chamber and deposit that insecticide in the predetermined amounts in a drop tube which is deposited at an interval corresponding to the deposit of a seed. The chambers sit on a meter wheel which rotates within a housing. As the meter wheel rotates, the chamber picks up a defined amount of insecticide and carries that insecticide to a release point located at an outlet port. Gravity causes the insecticide to travel both from the insecticide hopper to the meter, and from the meter down the drop tube to the ground.

4 Claims, 7 Drawing Sheets

CHEMICAL METERING APPARATUS FOR CONTROLLED DEPOSIT OF AGRICULTURAL CHEMICALS IN COORDINATION WITH SEED SINGULATION

BACKGROUND OF THE INVENTION

A. Field of the Invention

This present invention relates to the application of insecticides and other agricultural chemicals, while planting seed and, in particular, to a device for metering these chemicals so as to minimize the amount of chemical applied while planting different types of seeds and in different conditions.

This invention allows a user to dispense agricultural chemicals in conjunction with a precision seed metering device. The present invention allows the user to dispense a consistent amount of chemical necessary to protect a seed without unnecessary waste or over application. The chemical, typically an insecticide, is dispensed at the same time as the seeds are metered so as to coordinate the deposit of an amount of insecticide with the deposit of a seed. Further, the invention may be mounted on current seed metering devices if desired.

B. Problems in the Art

Although the application of chemicals in a variety of agricultural uses is common and in fact necessary in the operation of today's farms, for many reasons it is desirable to minimize the amount of chemical, such as insecticide, used and to be able to apply it only where necessary and as consistently as possible. For example, a number of agricultural chemicals are deemed environmentally undesirable and therefore it is incumbent upon farmers to minimize the amount used. This forces the farmer to draw a delicate balance between the amount of chemicals necessary to protect the crops, without the application of too much which may cause environmental damage. Unfortunately, chemical meters in the prior art are not uniform in their application of chemicals, which usually take the form of pesticides and insecticides in granular consistency. Although the overall application of chemical may apply the correct amount on a per acre basis, there are often times, for example, spots which are missed entirely by the application of insecticide and which are highly susceptible to damage caused by foraging insects. On the other hand, there are often times areas where the insecticide application is heavier than necessary, thereby wasting insecticide, and exposing certain areas to possible environmental damage.

In addition, recent attempts have been made to meter agricultural chemicals while planting seeds, such as the "Smart Box" by Ingersoll-Dresser. However, those methods create zones of heavy and light application that do not correspond to the metering of seed, thereby wasting chemicals and failing to achieve optimal efficiency.

Prior art insecticide meters also continue to dispense chemicals while the implement has left the field, for example, to turn around. This results in more unnecessary waste and a possible double application or spill.

The importance of the above-mentioned problems for farmers is very basic. Reduced accuracy and consistency translates into use of more chemicals or failure to provide adequate coverage. This translates into damage to seed crops as result of insect infestation, or increased cost associated with the price of the chemicals.

There is therefore a need in the art for a device which improves upon the problems and deficiencies in the art, and which is easy and quick to use, reliable, compact, effective, and results in increased efficiency in planting as well as monetary savings.

It is therefore a principal objective of the present invention to provide an insecticide metering device which improves upon or solves the problems and deficiencies existing in the art.

It is a further objective of this invention to provide an insecticide metering apparatus wherein the chemical is metered in a manner which will deliver an amount evenly, consistently and at a chosen rate and in conjunction with the deposit of a seed by a seed metering device.

Another objective of this invention is to provide an insecticide metering device which is applicable to a wide variety of planting applications and which is relatively non-complex in structure while achieving high accuracy.

Another objective of the present invention is to provide an insecticide metering device which is flexible as to types of agricultural chemicals as well as the speed or range of planting.

A still further objective of the present invention is to provide an insecticide metering apparatus which is efficient and economical, including with respect to the type and cost of materials, the power requirement, and resulting accuracy.

Another objective of the present invention is to provide an insecticide meter which is mounted on meters currently available.

Another objective of the present invention is provide an insecticide metering device which is durable and easy to manufacture and maintain.

These and other features, objectives, and advantages of the invention will become apparent to those skilled in the art with reference to the accompanying specification.

SUMMARY OF THE INVENTION

The present invention relates to a chemical metering apparatus for use with planting implements, and in particular, for use with seed metering mechanisms used with modern day planters. The invention allows accurate, consistent and reliable placement of agricultural chemicals, such as insecticides, with respect to planting of seeds and provides a mechanism which allows the dispensation of agricultural insecticide at variable speeds. Further, a variety of types of agricultural chemicals can be used with the present invention. It is anticipated that the invention can be used with both granular, powder, and liquid chemicals.

The invention is a metering apparatus which can be mounted to a seed meter now available in modern planters, the meter including a number of concentric circular elements which are mounted to the surface of the seed meter and which can operate off the same drive means used to power the seed meter. The meter can be mounted using a mounting bracket which is attached directly to the seed meter. A substantially circular meter housing is attached thereto and includes a conduit from the meter housing to the hopper of the chemicals. The chemical is transmitted down the conduit to the meter housing to a point in the housing known as the feeder opening. A meter wheel is placed within the housing and is supported for rotational movement therein. The meter wheel has a number of chambers surrounding its perimeter which correspond to the feeder opening. Gravity feeds the chemical into the chambers and, as the transmission wheel rotates, the chambers are rotated around the internal perimeter of the meter housing to a point adjacent an outlet port. When the chamber is positioned adjacent the outlet port, the chemical is transmitted by gravity through the outlet port and into a drop tube and deposited in the ground at predetermined intervals.

A drive wheel is positioned concentrically within the meter wheel and includes a transmission tooth which corresponds with a transmission notch in the meter wheel. As the drive wheel is rotated, rotary motion is transmitted to the meter wheel causing the meter wheel to rotate within the meter housing. The drive wheel is adapted to rotate off the means for rotation of the seed meter to which it can be attached. A mounting hub attaches the entire structure to the mounting bracket.

DETAILED DESCRIPTION OF THE PREFERRED EMBODIMENT

To provide a better understanding of the invention, one preferred embodiment of the invention will now be described in detail. It is to be understood that the preferred embodiment discussed below is but one form the invention can take and is not exclusive.

The description will make frequent reference to the accompanying drawings. Reference numerals and/or letters will be utilized to indicate certain parts or locations in the drawings. The same reference numerals and/or letters will be used to indicate the same parts or locations in all of the drawings unless otherwise indicated.

Figure 1:
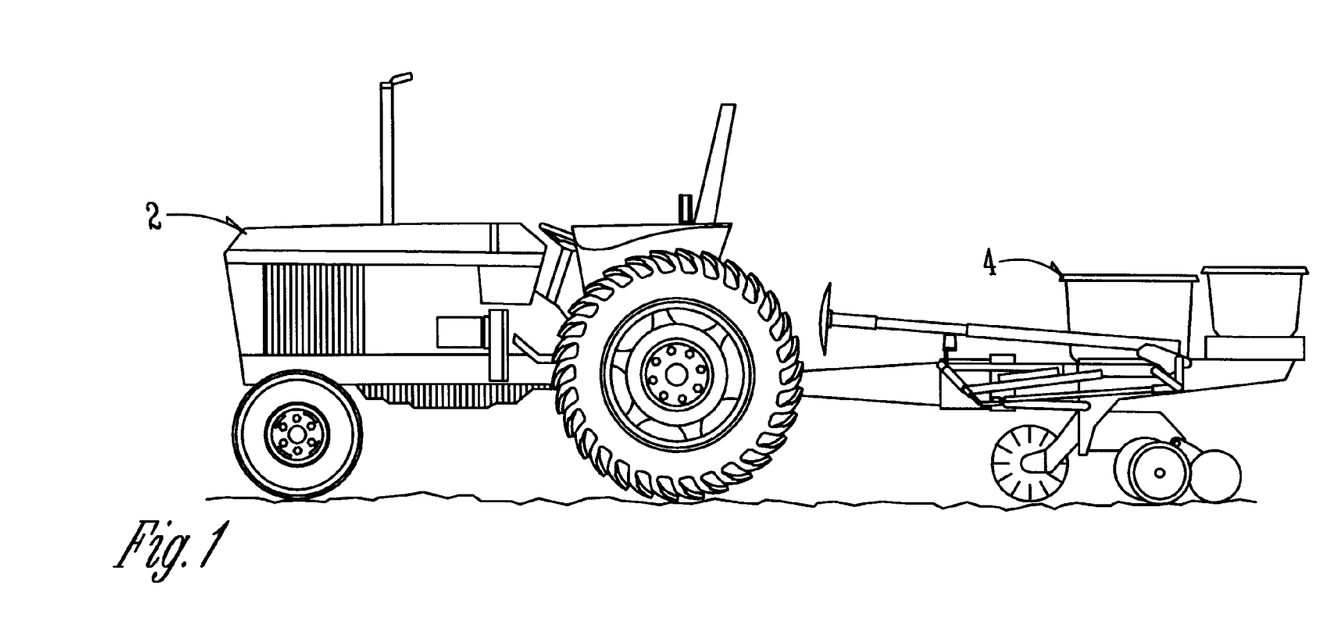
FIG. 1 is an elevational view of a tractor towing an implement containing a plurality of the chemical metering devices according to the present invention.
Figure 2:
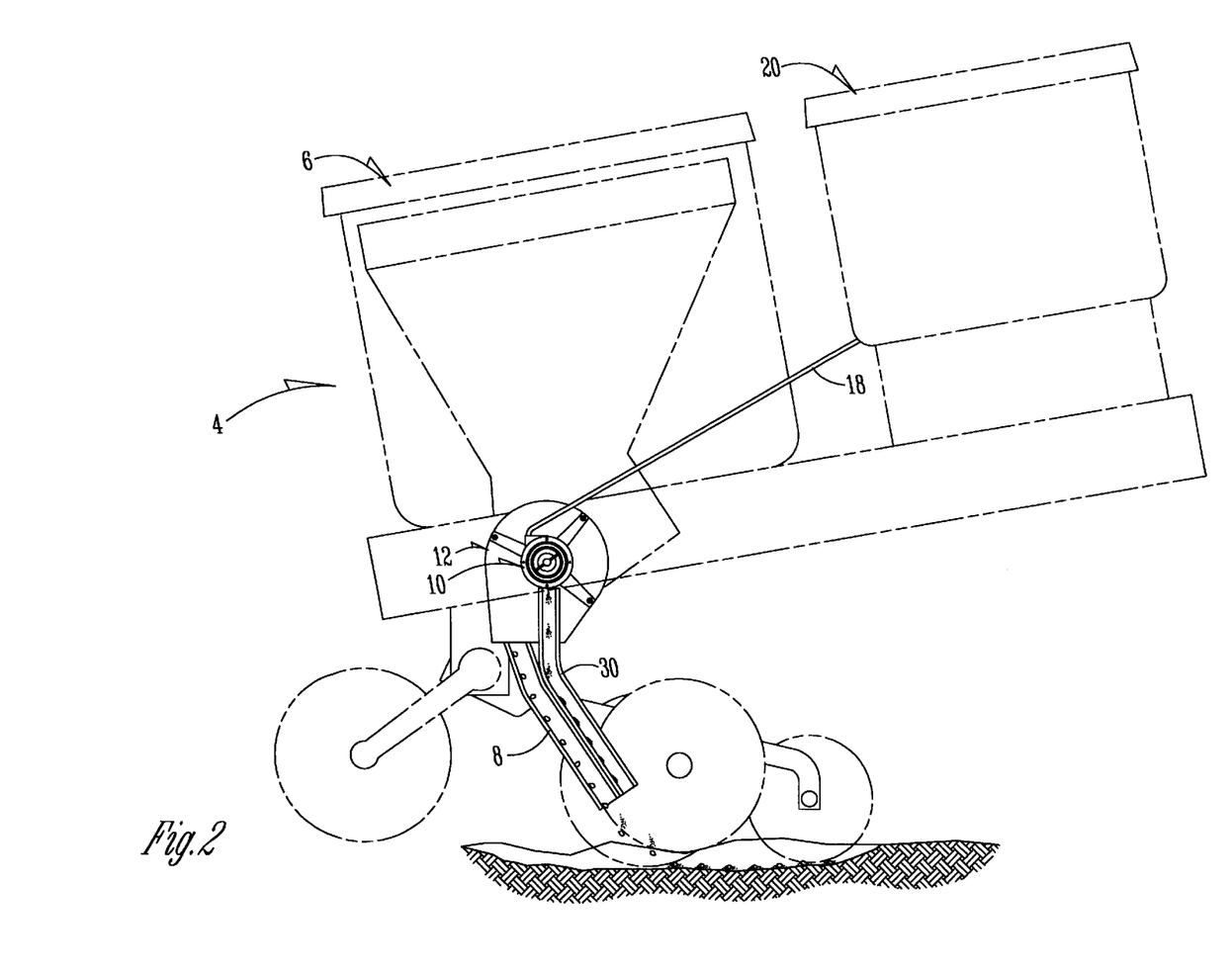
FIG. 2 is a sectional side view of the implement showing the seed meter and a sectional view of the chemical meter mounted thereon shown depositing chemicals, specifically granular insecticide, at a predetermined interval corresponding to the deposit of a seed.
Figure 3:
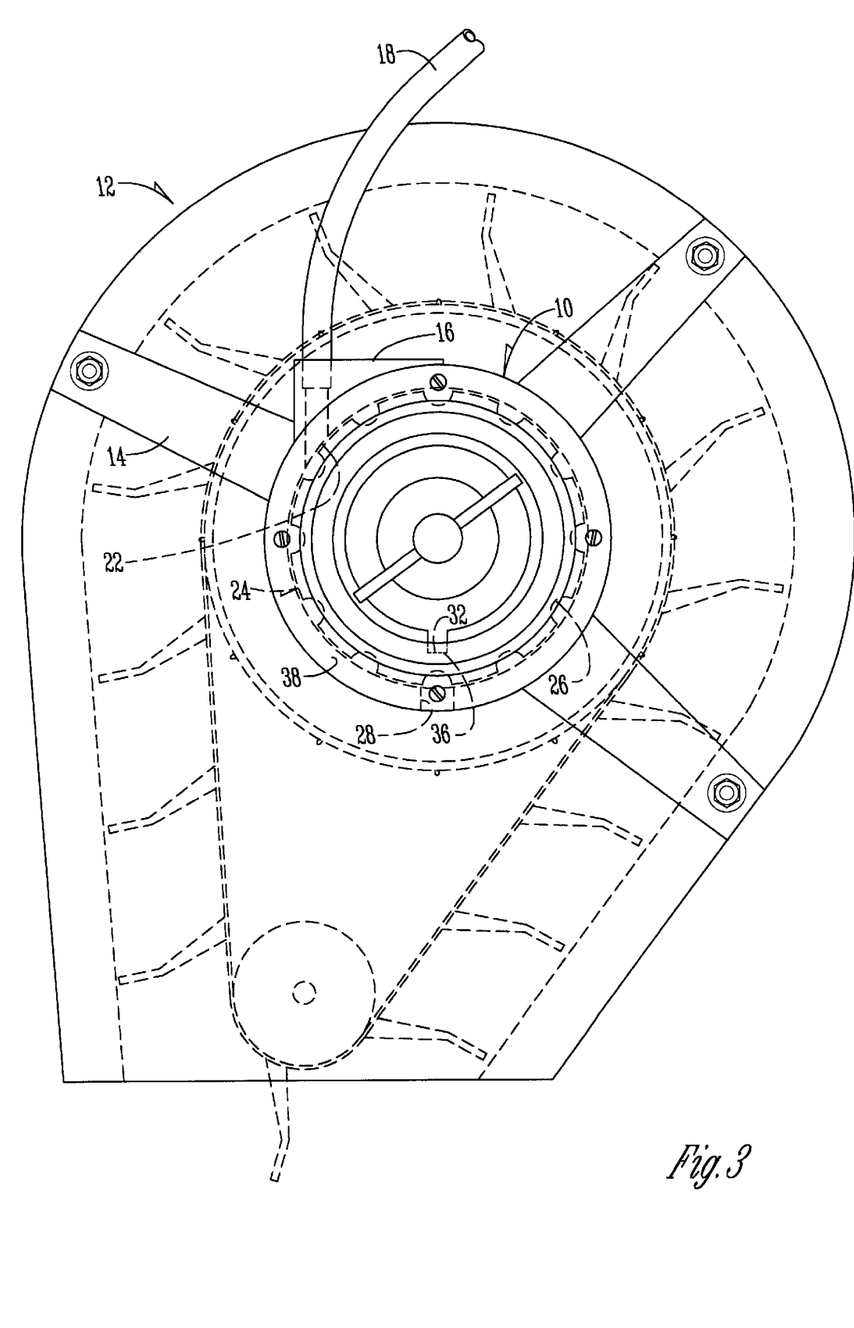
FIG. 3 is a sectional side of the insecticide meter of the insecticide present invention as mounted on a seed meter of the type known in the art.
Figure 4:
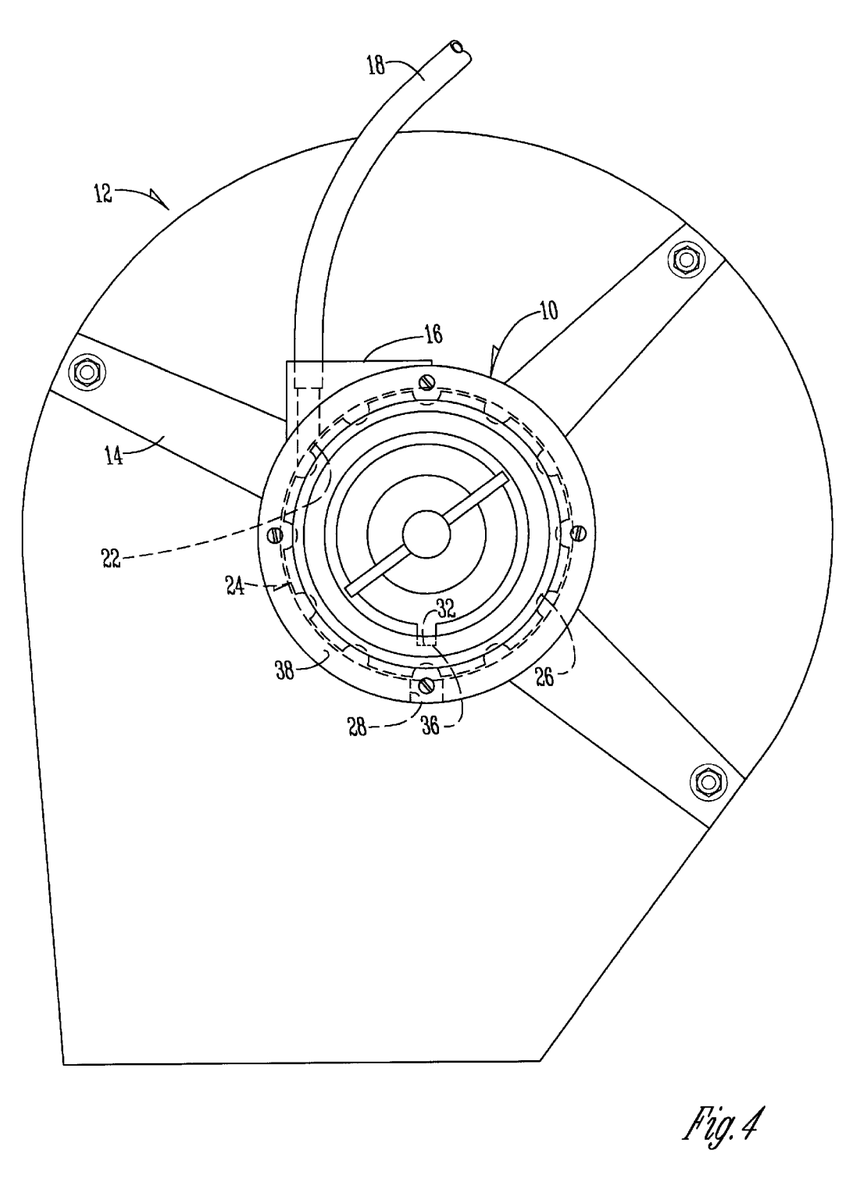
FIG. 4 is a side view of the chemical meter as attached to the seed meter.

For this description, the chemical meter will be used to distribute an insecticide. FIGS. 1 and 2 depict one environment in which the insecticide metering device of the present invention can exist. In FIG. 1, tractor 2 is shown connected to planter implement 4 in a typical arrangement for planting row crops in the ground. Seed is contained in seed hopper 6 and is transmitted by seed tube 8 at regular intervals to the ground.

Figure 5:
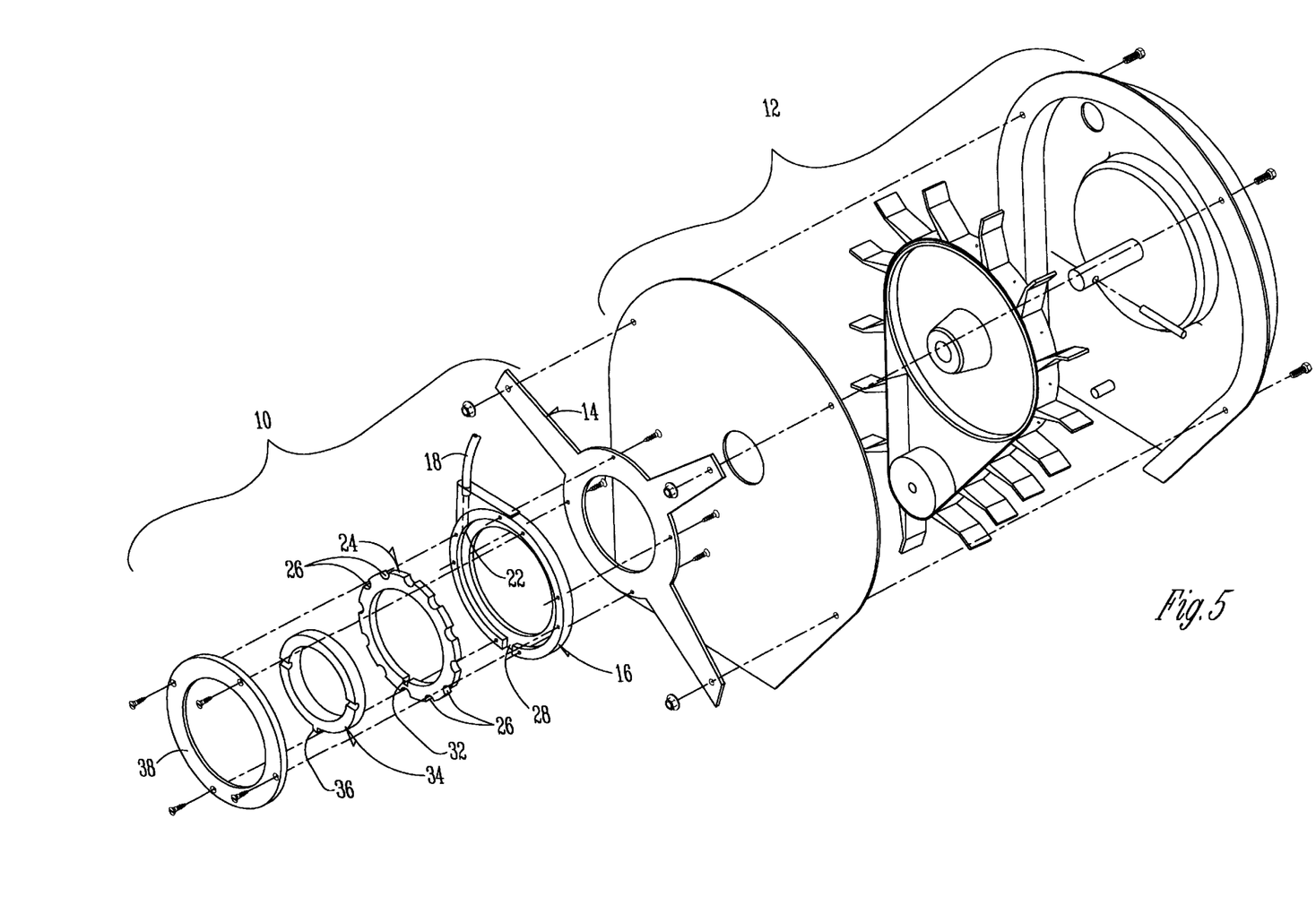
FIG. 5 is an exploded view of the seed meter and chemical meter.
Figure 5A:
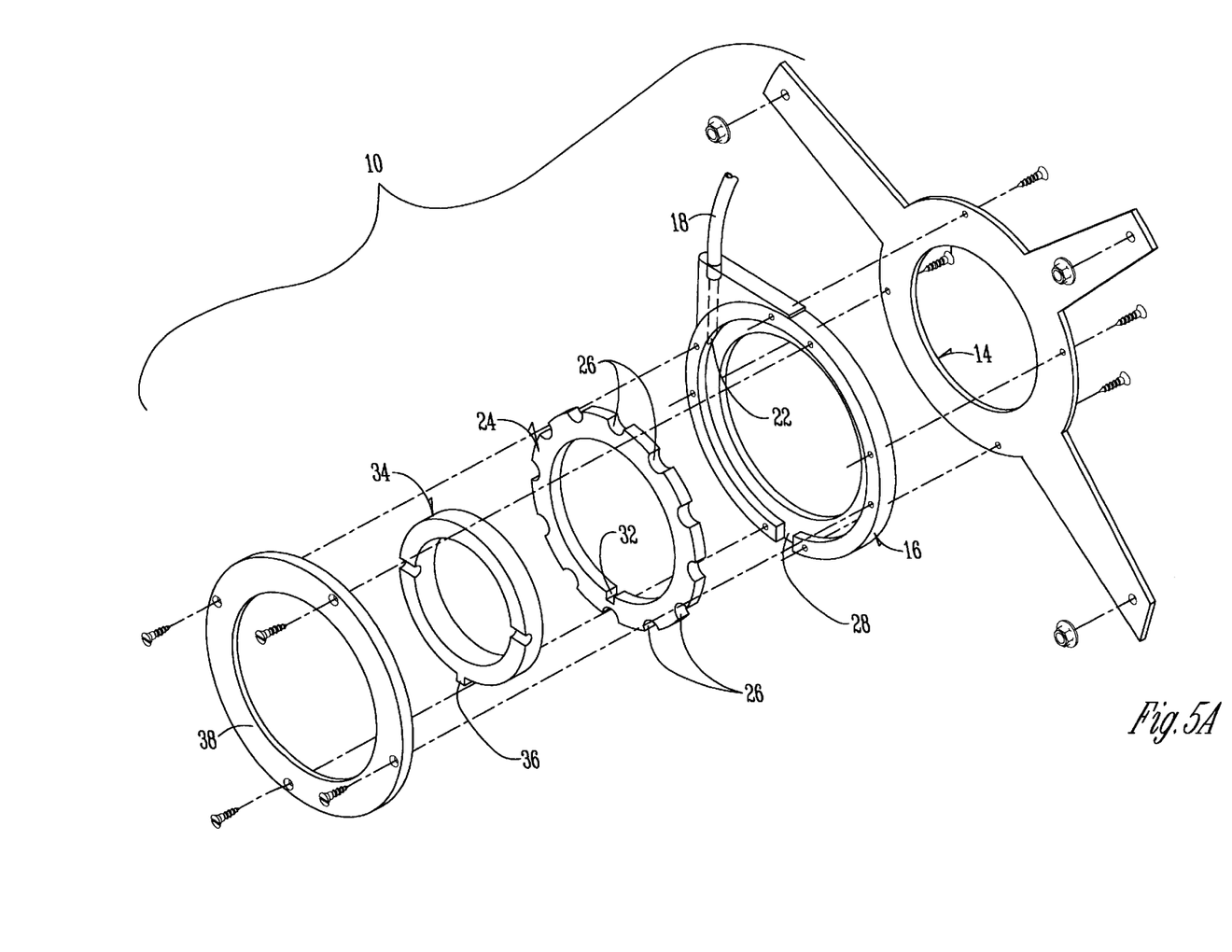
FIG. 5A is an exploded view of the chemical meter.

As best shown in the exploded view of FIG. 5, the present insecticide metering device 10 can be mounted on a seed metering device 12 as are currently found in the art. The insecticide meter 10 is comprised first of a mounting bracket 14 which can be used to mount the device 10 to a seed meter 12. A meter housing 16 is mounted to the bracket 14 and is fixed relative the seed meter 12. The seed meter 12 is shown as an example of the type of finger-pickup seed meter which has been in existence for decades. Seed meter 12A is a more advanced vacuum meter as used by John Deere & Co., for use on MAXEMERGE PLUS planting units and attachments.

The meter housing 16 contains an insecticide conduit 18 which leads to the insecticide hopper 20. Insecticide is transmitted from the hopper 20 through tube 18 by gravity to the meter housing 16. The insecticide travels down the insecticide conduit 18 to the feeder opening 22.

The meter wheel 24 is placed within the meter housing 16 and is supported for rotational movement therein. Chambers 26 are provided on the perimeter of the meter wheel to line up with the feeder opening 22 and to gather insecticide. The chambers can be made with predetermined sizes to correspond to the delivery of differing quantities of insecticide. As the chamber 26 corresponds with the feeder opening 22, it accumulates a quantity of insecticide. As the meter wheel 24 is rotated, the insecticide contained in the chamber 26 is transmitted to a point adjacent the outlet port 28 of the meter housing 16. At that point, the insecticide falls from the chamber 26 through the outlet port 28 and into the drop tube 30. The insecticide continues to travel down the drop tube 30 until it is deposited on the ground, typically in conjunction with the deposit of the seed from the seed meter. This near simultaneous deposit is best shown in FIG. 2. This results in a synchronized deposit of both seed and insecticide.

Figures 6, 7:
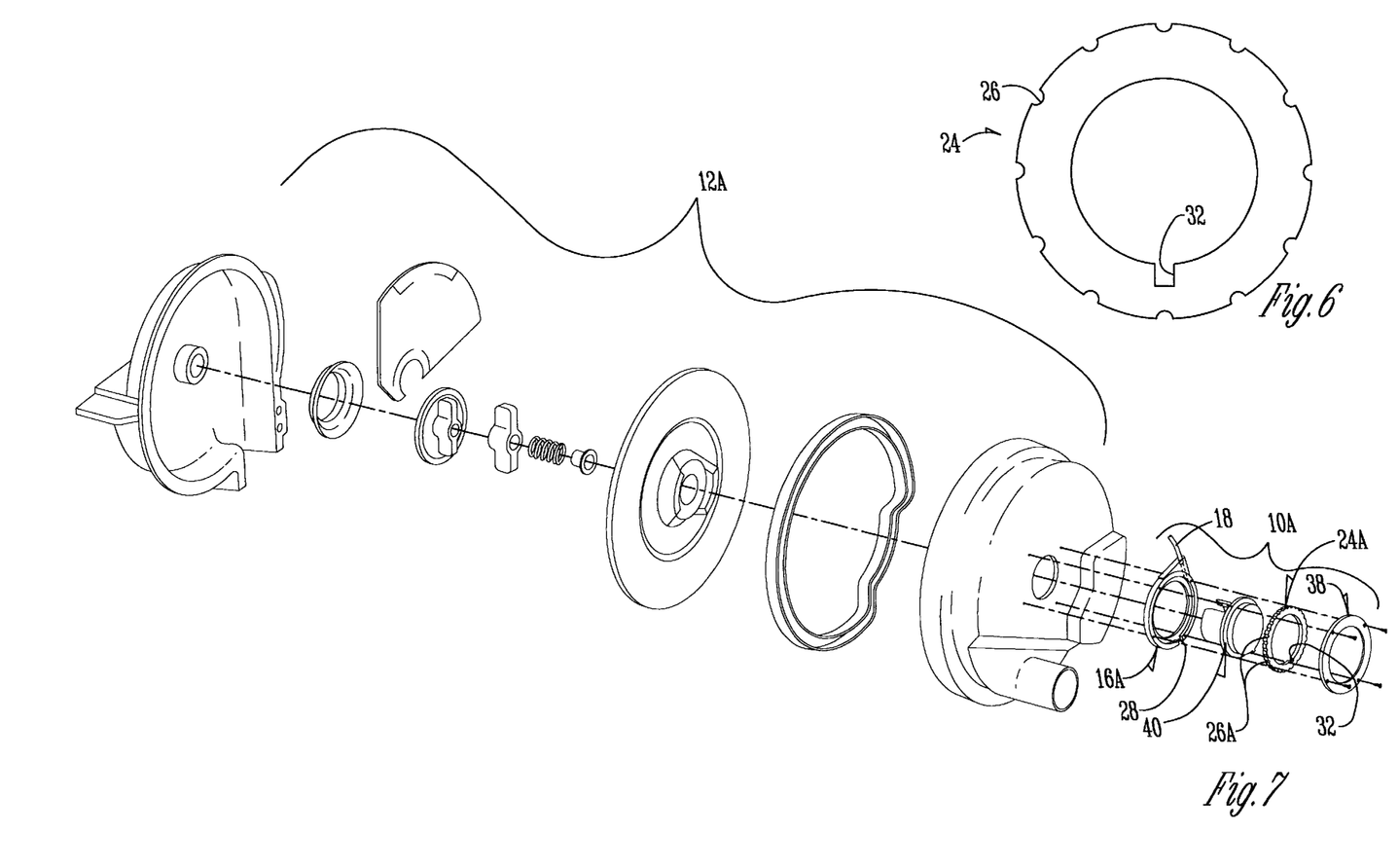
FIG. 6 is a close-up side view of the meter wheel.
FIG. 7 is an exploded view of another type of seed meter and the chemical meter of the present invention.

The meter wheel 24 contains a transmission notch 32. A drive wheel 34 is placed concentrically within the meter wheel 24. A transmission tooth 36 extends from the perimeter of the drive wheel 34 and is received by the transmission notch 32 of the meter wheel 34. The drive wheel is powered by the drive means of the seed meter 12 such that an increase or decrease in the speed of the seed meter 12 will cause a corresponding increase or decrease in the speed of the transmission tooth 36 on the drive wheel 34. Mounting hub 38 is placed over the drive wheel 34 and meter wheel 24 and mounts directly to the housing 16.

It is to be understood that in the preferred embodiment, the insecticide metering device of the present invention 10 is relatively compact in size therefore allowing minimal interference when placed on a seed metering device 12. There should be no effect to the spacing between various seed metering devices 12 in miscellaneous planting applications. It is also to be appreciated that the included preferred embodiment is given by way of example only. The present invention can take many forms in embodiments. The true essence and spirit of this invention is defined in the appended claims. It is not intended that the embodiment of the invention presented herein limit the scope thereof. It can be seen, however, that the present invention accomplishes at least all of the stated objectives.

Further, the preferred embodiment can be used with a multiplicity of variations of seed meter device including those presently available in the marketplace. The invention can work not only with major seed crops such as field corn and soy beans, but also many types of seeds including but not limited to such seeds as popcorn, pinto beans, etc.

What is claimed is:

1. A chemical meter for dispensing agricultural chemicals, the chemical meter being operatively connected to a seed singulation device having a source of seed and comprising:
    a container of the agricultural chemical to be metered, the container mounted on a farm implement and separated from the source of seed;
    a housing connected to the container by a conduit, the conduit having one end terminating at the container and having a second end terminating at an opening within the housing, a meter wheel mounted rotatably within the housing, the meter wheel having a plurality of chambers disposed about the perimeter of the meter wheel, the chambers capable of movement between a first position adjacent the opening at the end of the conduit to a second position immediately adjacent a chemical drop area and being spaced so as to coincide metered chemical deposit with a seed deposit by the singulation device, a drive wheel for transmitting rotary motion of the seed singulation device to the meter wheel, and a drop tube with one end located adjacent the drop area of the meter wheel for depositing the chemical in a field at the same time that a seed is deposited by the seed singulation device, the drop tube being located in proximity with a seed drop tube of the seed singulation device.

2. The chemical meter of claim 1 wherein the chambers are designed to receive a predetermined amount of agricultural chemical at the first position.

3. The chemical meter of claim 2 wherein the meter wheel and drive wheel share a common axis.

4. The chemical meter of claim 3 wherein the meter wheel and drive wheel are concentric.

\* \* \* \* \*